Jan. 12, 1937.  G. ROUDANEZ  2,067,650
AUTOMATIC SPEED CHANGE POWER TRANSMISSION
Filed Oct. 17, 1932  3 Sheets-Sheet 1
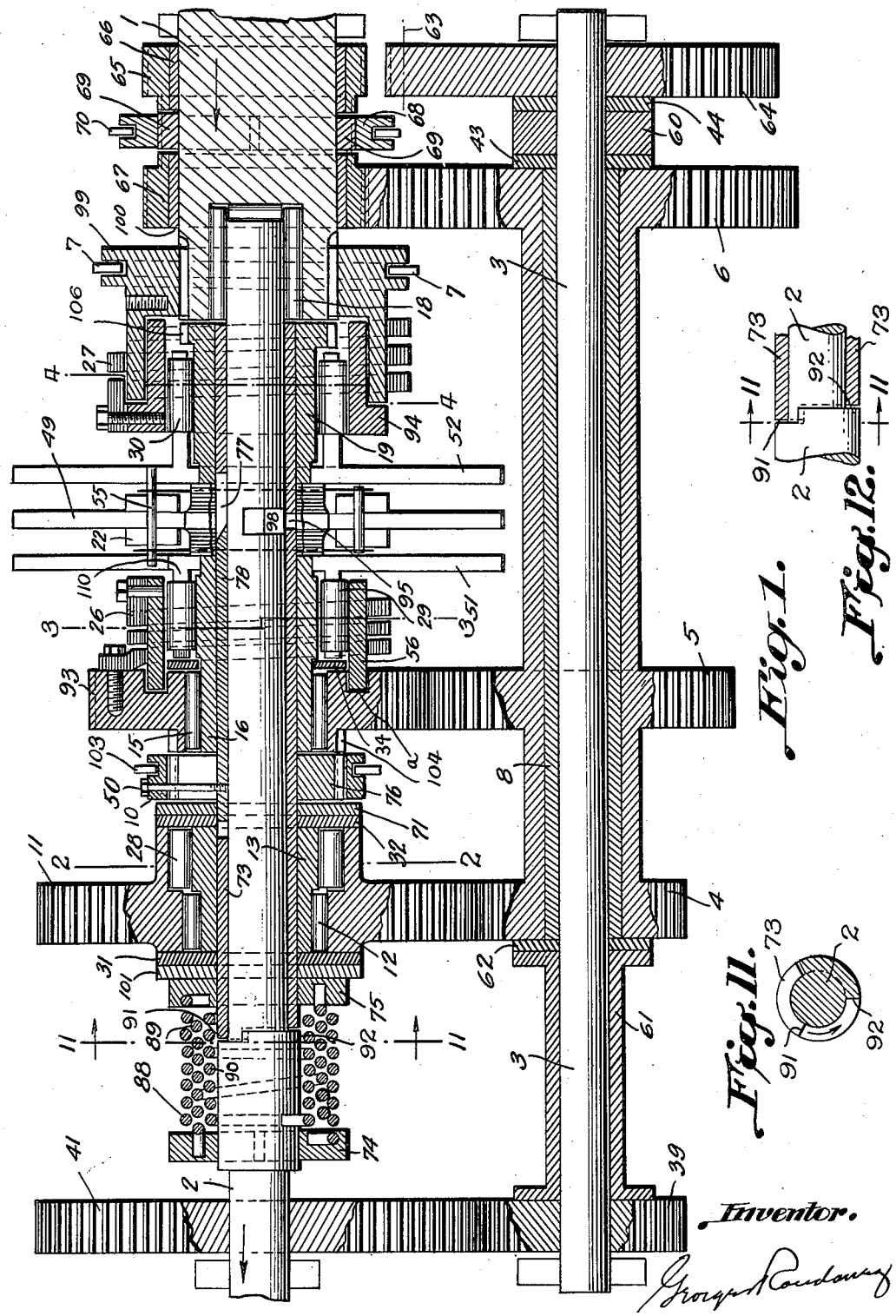
Fig.1. Fig.12. Fig.11.
Inventor.

Jan. 12, 1937. G. ROUDANEZ 2,067,650
AUTOMATIC SPEED CHANGE POWER TRANSMISSION
Filed Oct. 17, 1932 3 Sheets-Sheet 2
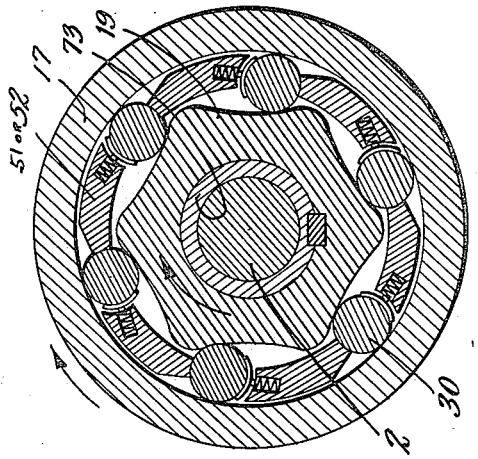
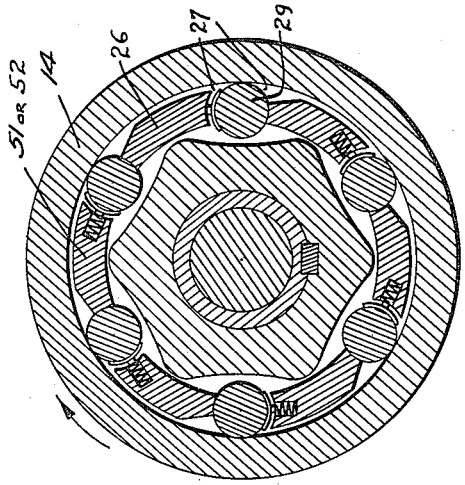
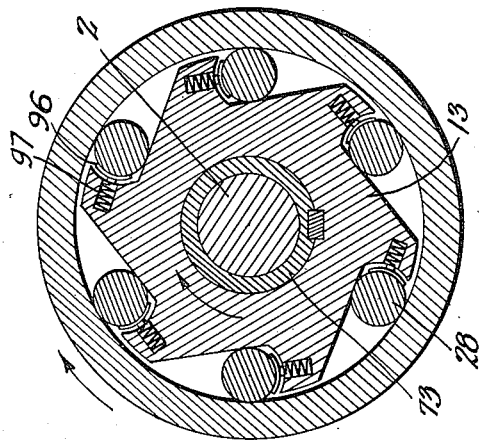
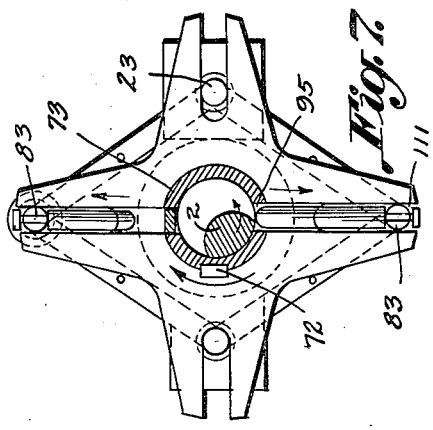
Inventor.
Georges Roudanez

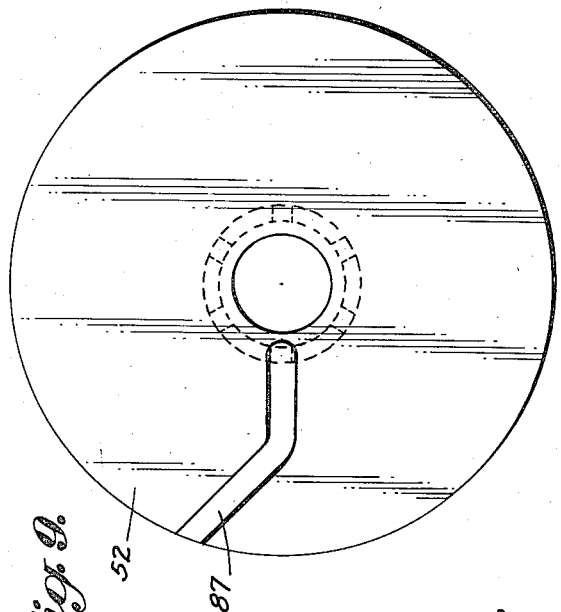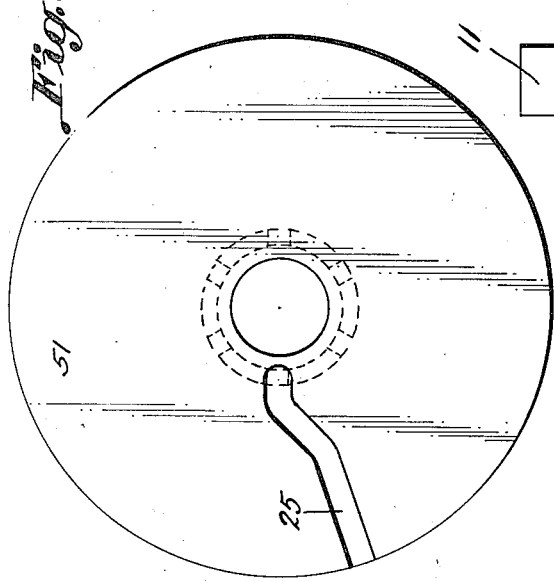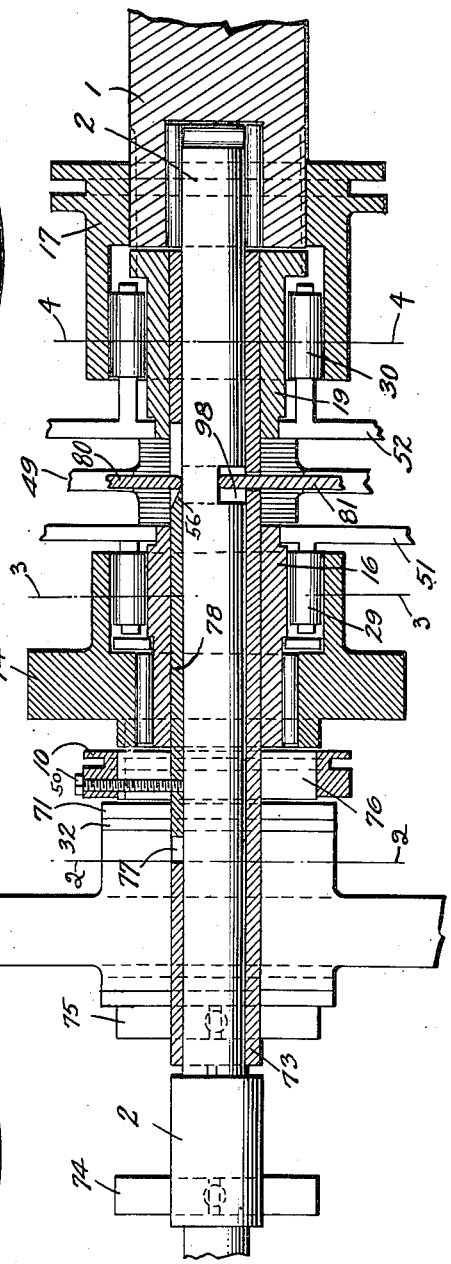

Patented Jan. 12, 1937

2,067,650

UNITED STATES PATENT OFFICE 2,067,650

AUTOMATIC SPEED CHANGE POWER TRANSMISSION

Georges Roudanez, Chicago, Ill.

Application October 17, 1932, Serial No. 638,165

8 Claims. (Cl. 74—336)

The invention relates to mechanism operatively connecting a driving shaft with a driven shaft wherein the rate of rotation of the driven shaft relative to the rate of rotation of the driving shaft is increased or diminished with changes in speed of the respective shafts and more particularly the invention relates to mechanism especially adapted for operatively connecting the driving shaft with the driven shaft of an automobile.

In automobiles as at present constructed it is the common practice to provide transmission gears operatively connecting the driving shaft with the driven shaft and also to provide gear shift mechanism manually operable to connect the driving and driven shafts by what are known as low, second and high speed gears.

It is an object of the invention to provide improved transmission mechanism adapted to operatively connect and disconnect a driven shaft with a driving shaft in a manner whereby simultaneous action of a combination of predetermined changes in the rate of rotation of the driven shaft and predetermined torque resistance of the driven shaft will automatically change the ratio of the rate of rotation of such shaft relative to the rate of rotation of the driving shaft.

A still further object of the invention is the provision of an improved transmission mechanism of the kind described adapted to operatively connect a driven shaft with a driving shaft in a manner whereby the ratio of the rate of rotation of the respective shafts is maintained constant for all speeds of the driven shaft between selected or predetermined upper and lower limits and to automatically increase the ratio of the rate of the driven shaft to that of the driving shaft in a substantial amount upon the driven shaft reaching said upper limit of speed or upon the driven shaft reaching a lower limit of torque resistance and to maintain said substantially increased ratio for all speeds of the driven shaft above said upper limit or between said upper limit and a higher predetermined or selected upper limit said mechanism being also adapted to automatically diminish the ratio of the rate of the driven shaft to that of the driving shaft in a substantial amount upon the driven shaft reaching said lower limit of speed or upon the driven shaft reaching a higher limit of torque resistance and to maintain said substantially diminished ratio for all speeds of the driven shaft below said lower limit or between said lower limit and a still lower selected or predetermined rate of the driven shaft, or a still higher selected or predetermined torque resistance of the driven shaft.

Still another object of the invention is the provision of an improved gear transmission of the kind described and speed responsive control means, and torque resistance control means, therefor, which is adapted to automatically bring the low, second and high speed gears of an automobile into and out of operative relation to the driving and driven shafts of an automobile in accordance with either predetermined rates of speed, or predetermined torque resistance, of the driven shaft.

A still further object of the invention is the provision of improved transmission means adapted to operatively connect a driving shaft with a driven shaft in a manner whereby the ratio of the rate of rotation of the driven shaft to the rate of the driving shaft is maintained constant for all rates of the driven shaft between selected or predetermined upper and lower limits and the provision of speed responsive control means in conjunction with torque resisting control means operable automatically to change the ratio of the rate of rotation of the driven to that of the driving shaft upon the driven shaft exceeding said upper limit, said changed ratio being constantly maintained for all speeds of the driven shaft above said upper limit and below a higher predetermined upper limit.

A still further object of the invention is in the provision of an automatic transmission of the kind described wherein optional manual control means of the usual type is adapted in such a manner wherein, when the manual means is operatively actuated the automatic means and the free-wheeling means will become ineffective and will continue to be ineffective until the manual control means has been manually released.

A still further object of the invention is in a transmission with a triple means of control comprising predetermined speed responsive control means, predetermined torque resisting control means, and manually actuated control means.

Another object of the invention is in a transmission wherein the speed changes are controlled either by speed responsive means, or torque resisting means, and where either of said means when operatively functioning will cause the other of said means to become ineffective.

Another object of the invention is in a transmission having both predetermined speed control and torque resisting control means functioning so that the car will, in operation, start automatically in low speed, without strain to the motive power through the speed responsive control means, and thereafter having the combination of control means performing simultaneously.

Still another object of the invention is the provision of improved means permitting "coasting" of an automobile in combination with an automatic speed change and control mechanisms, the latter being operable in response to the simultaneous action of either predetermined changes in speed of the driven shaft, or predetermined torque resistance of the driven shaft in the manner described.

Still another object of the invention is the introduction in an automatic transmission of means engaging the different speed changes so as to prevent the possibility of a sudden grab of the gears if the change occurs during the application of power.

A still further object of the invention is the provision of a device operable as described which is novel, simple, compact, durable and satisfactory for its intended purpose.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like, or corresponding parts:—

Fig. 1 is a sectional view of one embodiment of the invention.

Fig. 2 is a sectional view along the line 2—2 of Fig. 1 showing over-riding mechanism for low speed;

Fig. 3 is a sectional view along the line 3—3 of Figure 1, illustrative of the idling position of the mechanism and typical of the corresponding idling position of the mechanism shown in Figure 4;

Fig. 4 is a sectional view along the line 4—4 of Figure 1, illustrative of the driving position of the mechanism and typical of the driving position of the corresponding mechanism shown in Figure 3;

Fig. 5 is a view of a governor or speed responsive means, also a view of part of the torque resistance control means; also, a view of part of the manual control means, mounted on the driven shaft, showing the position of either of said means in position to operatively engage the driven shaft in high speed.

Fig. 6 is a view of a governor or speed responsive means, also a view of part of the torque resistance control means; also a view of part of the manual control means, mounted on the driven shaft, showing the position of either of said means in position to operatively engage the driven shaft in second speed.

Fig. 7 is a view of a governor or speed responsive means, also a view of part of the torque resistance control means; also a view of part of the manual control means, mounted on the driven shaft, showing the position of either of said means in position to operatively engage the driven shaft in low speed.

Fig. 8 is a view of disc or collar mounted on the driven shaft adjacent to, and in cooperative relation with, the second speed gear and the speed control means illustrated in Figs. 5, 6, and 7.

Fig. 9 is a view of disc or collar mounted on the driven shaft adjacent to, and in cooperative relation with, the high speed gear and the speed control means illustrated in Figs. 5, 6, and 7.

Fig. 10 is a sectional view illustrating another embodiment of the invention, comprising a modified form of second and high speed mechanisms, also, showing the adaption of manual means to the device.

Fig. 11 is a section along the line 11—11 of Fig. 1; and

Fig. 12 is a fragmentary view of telescoping shafts forming part of the device.

Referring now more particularly to the drawings the numerals 1 and 2, respectively designate parallel aligned driving and driven shafts, adapted for use on automobiles and similar mechanisms. The shafts are mounted in a transmission housing (not shown). One end of shaft 2 is recessed into suitable bearings mounted within one end of shaft 1, while the other end of the shaft is journaled in and projects beyond the housing walls; the projecting end being shown as broken away. The projecting end of driving shaft 1 extends to operative connection with an automobile motor, or similar source of power, (not shown). The projecting end of driven shaft 2 likewise extends to operative connection with the rear axle drive of an automobile, or other driven mechanisms, (not shown).

The ends of auxiliary shaft 3 are recessed in suitable bearings mounted on the opposite walls of the housing. The auxiliary shaft 3 has a bearing 8 mounted thereon and rotatable with the shaft. A cluster of gears 4, 5, and 6 is rotatably mounted on auxiliary shaft 3 over bearing 8, and constitutes the low and second speed driving gears. A thrust bearing 43 fills the space between the gear 6 and the adjacent end of the sleeve 60, and a thrust bearing 44 similarly fills the space between the gear 64 and the adjacent end of the sleeve 60. A flanged sleeve 61 is also mounted on and rotatable with the auxiliary shaft 3. A thrust bearing 62 fills the space between the gear 4 and the adjacent end of flanged sleeve 61. The flanged sleeve 61, the bearings 62, 43, 44, the sleeve 60 and the gears 4, 5 and 6, prevent longitudinal movement between the gear 39 and the gear 64 upon the shaft 3.

An idling reverse gear, not shown, is mounted on a stud shaft, not shown; however, its position is designated by the center line 63 in a position wherein it is always in mesh with and between gear 64 and the gear 65. The gear 64 is secured to the auxiliary shaft 3 while the gear 65 is rotatably mounted on bearing 66 which is mounted on the driving shaft 1, and is constantly meshed with the reverse idling gear. A driving gear 67 is rotatably mounted on driving shaft 1, and is in constant mesh with the gear 6 of the gear cluster 4, 5 and 6. The gear 39 is secured to the auxiliary shaft 3 and is in constant mesh with the gear 41 which is keyed to the driven shaft 2.

A sliding clutch 68 is slidably mounted on the toothed base 69 which is keyed to the driving shaft 1. The gears 67 and 65 are so constructed as to have a toothed projection of the same dimensions as the toothed base 69 so that the sliding clutch 68 can become engaged with either the gear 65 and the toothed base 69, or with the gear 67 and the toothed base 69. The sliding clutch 68 can also remain in neutral position to either gears 65 or 67 by being held in position on the toothed base 69. The sliding clutch 68 is manually actuated so as to engage the gear 67 for forward speed, or to engage the gear 65 for reverse speed or can be held in neutral position to either. The manual means is shown in the usual fork 70.

Gears 11 and 93 are mounted over the shaft 73, and respectively mesh with the gears 4 and 5 mounted on the auxiliary shaft 3. The gears 11 and 93 are independently rotatable relative to each other and to the driven shaft 2. Gears 11 and 93 are separated by a washer 71, a thrust bearing 32, and a toothed base 76.

The meshing gears 11 and 4 provide a low speed transmission connecting the driven shaft 2 with gear cluster 4, 5 and 6. The mounting of gear 11, on the shaft 2, is illustrated in Fig. 2 and comprises a roller bearing base 13 fixedly mounted on the tubular auxiliary driven shaft 73. The tubular driven shaft 73 has fixedly mounted thereon the collar 75, the roller bearing base 13, the toothed base 76, the roller bearing base 16.

The tubular shaft 73 is rotatable approximately one-third of a revolution relative to the shaft 2 to bring the shoulder 91 on the tubular shaft into operative engagement with the shoulder 92 on the shaft 2 for a purpose hereinafter more particularly described. The gear 11 is rotatably mounted on roller bearing base 13 with roller bearings 12 and rollers 28 circumferentially spaced between to form a free wheeling connection for the gear and base. Gear 93 is similarly mounted on roller bearing base 16 with roller bearings 15 and rollers 29 circumferentially spaced between to form a free wheeling connection.

The gear 11 has an annular hub portion surrounding, and spaced apart from, a correspondingly projecting portion of the base 13. The projecting portion of the base 13 has its outer periphery providing a plurality of ratchet-like projections equally spaced away from the inner periphery of the surrounding annular hub portion. The spacing being such that the rollers 28, positioned one in each of the depressions between the projections, cannot ride over the projections. The depressions are of such a depth that the rollers 28 will permit the shaft 2 and the base 13 to rotate in the direction of the arrow without rotating the gear 11. On the other hand, rotation of the gear 11 in the direction of the arrow causes the rollers to move to the position of the gear and will similarly rotate the shaft 2. The rollers 28 are constantly under pressure of the spring 97 and curved close fitting plate 96, (Fig. 2).

The meshing of gears 93 and 5 provide a second speed transmission connecting the driven shaft 2 with the driving gear cluster 4, 5, and 6, while the high speed is accomplished by connecting the driving shaft 1 with the driven shaft 2 through the high speed mechanism as will be explained further.

The mounting of the second speed gear 93 and the high speed driving member 99 is illustrated in Figs. 3 and 4. The second speed driven mechanism includes the gear 93, an annular collar 56 loosely mounted in countersunk portion "a" of gear 93, and a spring 26 resiliently connecting the collar with the gear. The second speed driven mechanism also includes the roller bearing base 16, fastened to the tubular shaft 73 by a key, and a roller control collar 51. The collar 51 is mounted on the shaft 73 and has a hub portion surrounding and concentric with the base 16. The hub portion of the collar 51 comprises a plurality of longitudinally extending spaced apart sections 101, between each of which is positioned one of the rollers 29. The projecting portion of the base 16 has its outer periphery providing a plurality of ratchet-like projections equally spaced from the inner periphery of the surrounding annular hub portions of collar 56, the spacing being such that the rollers 29 cannot ride over said projection portions. The depressions between the ratchet-like projections are of such a depth that the rollers 29, held therein by the collar 51, will permit the base 16 to rotate without rotation of the gear 93 when the rollers are in the position shown in Fig. 3. When the roller control collar 51 moves the rollers 29 connecting the inner periphery of the surrounding hub portion of gear 14 or 93 and the ratchet-like projections on base 16 in the direction of the arrow to the position of Fig. 4, the base 16 is operatively connected with the gear 93 and the gear is thereby rotated with shaft 2. High speed mechanism 99, rollers 30, roller bearing base 19, and roller control collar operates in identically the same manner.

The meshing gears 67 and 6 provide a high speed transmission including an annular collar 94 loosely mounted on the inner periphery of a driving member 99 and resiliently connected therewith by means of spring 27, the driving member being splined to the drive shaft 1 and slidably movable thereon. The driving member 99 has an annularly extended portion 94 surrounding an annular roller bearing base 19, similar to the base 16, the base 19 being fixedly mounted on the tubular shaft 73 by means of a key. The high speed mechanism also includes a roller control collar 52, similar to collar 51 and similarly cooperating with rollers 30, positioned between the longitudinally extending spaced-apart sections of the hub portion of the collar. The neutral position of the rollers 30 is the same as shown in Fig. 3 for rollers 29 and their actuating position when operatively connecting the high speed driving member 99 with its corresponding roller bearing base 19 and thereby with the shaft 73 is the same as that illustrated in Fig. 4 for the corresponding members of the second speed transmission.

The collars 51 and 52 are movable from their respective neutral positions, shown in Fig. 4, by means of a governor 49, fixedly mounted on the shaft 73 between the collars 51 and 52. Figs. 5, 6, and 7 are detailed views of the governor 49 which is fixedly mounted on the tubular shaft 73 by key 72, Fig. 5, and whose outer extremities comprise four symmetrically positioned slotted radial projections, two of the oppositely positioned slotted projections providing a mounting for a pair of weights 22. The weights 22 are connected by two oppositely extending pairs of links 79 and 82, the outer extremities of which are connected by pins 83 slidably mounted in the slots of the projections. A double set of springs 84 and 85 are so connected to the links of the governor 49 as to hold the weights 22 in their collapsed position as shown in Fig. 7. The set of springs 85 of the governor 49 are so adjusted as to hold the weights 22 against outward movement by centrifugal force until the shaft 73 has reached a predetermined rate of rotation selected as the desired rate for change from low speed to second speed of the shaft 73. The set of springs 84 of the governor 49, Fig. 5, are so constructed that they will apply their additional tension to the spring 85 so as to hold the weights 22 against outward movement by centrifugal force until the shaft 73 has reached a predetermined rate of rotation selected as the desired rate for change from second speed to high speed of the driven shaft 73.

In the collapsed position of the governor 49, the corresponding collars 51 and 52 are in their neutral positions as shown in Fig. 3, and means are provided whereby outward movement of the weights 22, produced by centrifugal force, will move the cooperating collars 51 and 52 to the position of Fig. 4, wherein the corresponding gear 93 and high speed member 94 are in a position to rotate the shaft 73.

The means provided to accomplish this result include a pin 55 projecting from one end of one of the weights 22 of the governor 49 into a slot 25 (Fig. 8) on collar 51, while the other end of the pin 55 projects into a slot 87 on collar 52 (Fig. 9). The slots 25 and 87 are inclined to a radial line in such a manner that outward movement of the weights 22 and of the pin 55 in the slots 25 and 87 respectively, rotate the collars 51 and 52 relative to the shaft 73 from their position of Fig. 3 to their position of Fig. 4 and return movement of the weights 22, occasioned either by a slackened speed and insufficient centrifugal force to keep the weights extended, or by the increased torque resistance of the shaft 2 (as will be explained) will return the collars to their neutral position of Fig. 3.

The described action of the governors and collars results from movement of the shafts 1 and 73 in the direction indicated by the arrows, Fig. 4, and this direction is indicative of the action of the mechanism for all speeds of the driven shaft 73, corresponding to forward speed of the mechanism and of an automobile on which the mechanism may be mounted. The shaft 73 may be operated in the direction opposite to that indicated by the arrow, Fig. 3, with the gears 11, 93 and high speed driving member 99, all idling on said shaft.

A collar 74 is fixedly mounted on shaft 2, and a similar collar 75 is fixedly mounted on the rotatably mounted tubular shaft 73. Springs 88, 89, and 90 connect the collar 74 with 75 in such a manner that the shaft 73 will rotate over shaft 2 proportionately to the torque applied and the pre-determined torque resistance selected until positive contact is made between shafts 73 and 2, this positive contact being accomplished by the projected extension 91 on shaft 73 engaging projected extension 92 of shaft 2 thus connecting the two shafts. Projected extensions or shoulders 91 and 92 on shafts 73 and 2, respectively, will positively engage shaft 73 with shaft 2 if and when the torque resistance of springs 88, 89, and 90 has been exhausted.

A portion of shaft 2 is cut away so as to form a cam 98 lying within the hub of governor 49. The governor 49 is fastened to shaft 73 by a key 72. A plunger 81 has its inner end extending through registering apertures 101 and 95 in the governor hub and the shaft 73, respectively. The outer end of the plunger 81 is fastened to a pin 83 which in turn is connected with governor links 82. Springs 84 and 85 respectively control the connected links 79 and 82 and tend to force the pin 83 outward radially. Governor weights 22, when the pre-determined speed is reached, will cause the pin 83 to move radially inward. Should the pre-determined torque resistance be reached so as to cause shaft 73 to limitedly rotate over shaft 2, such rotation will operatively engage the cam 98 with and force the plunger 81 radially outward even against the centrifugal force of the weights 22.

The automatic features are rendered inoperative by shifting the member 10 by means of a fork 103. The member 10 is connected with and rotated by the shaft 73 through the medium of the member 76 as best shown in Figure 1. The member 76 has teeth or corrugations on its outer periphery which mesh with similar teeth or corrugations formed on the inner periphery of the member 10. The hub of the member 93 is provided with teeth to form a gear 104 of the same diameter as the member 76 and with its teeth having the same pitch. The members 10 and 76 are locked together by their respective teeth or corrugations and are rotated together by the shaft 73. The member 10 is connected by means of a bolt 50 with a lug or rod 78 slidable in a longitudinal slot 77 provided in the shaft 73. The member 76 is slotted to permit its movement longitudinally relative to the bolt 50 as the member 10 is moved by manual actuation of the fork 103. The longitudinal movement of the member 10 by the fork 103 to the right as observed in Figure 1 results in the teeth of the member 10 engaging the teeth of the gear 104 and thereby locks the member 93 against rotation relative to the members 10 and 76. The described movement of the member 10 similarly moves the lug 78 to a position wherein the bevelled end of the lug engages the plunger rod 80 and actuates the rod outwardly. Since the rod 80 is operatively connected with the governor 49 in the same manner as described for plunger rod 81, outward movement of the rod 80 will force the weights 22 inwardly against their centrifugal force and thereby produces a positive connection in second speed, during which time the high speed automatic features are inoperative. The high speed features are again rendered operative by returning the member 10 to its original position as shown in Figure 1. The high speed sliding clutch 99 is shiftable to direct engagement with the toothed portion of base 19 for positive engagement between shafts 1 and 2 for high speed by manual control. The springs 88, 89, and 90 are provided as a resilient connection for the shafts 2 and 73. The outer spring 88 initially resists the torque resulting from the starting of the shafts and as the torque increases, the springs 89 and 90 also function in the order named to resist the torque. The provision of a plurality of springs cooperating in the manner described and shown minimizes or prevents shock that would initially result from a more rigid connection such, for example, as a single spring having the same resistance to torque as the three springs combined.

Another embodiment of the invention is illustrated in Fig. 10, wherein second speed unit (93, 26, and 56) of Fig. 1 instead of being a resilient assembly unit could be changed to a single unit gear 14 as shown in Fig. 10, likewise the high speed unit (94, 27, and 99) of Fig. 1 instead of being a resilient assembly unit could be changed to a single unit 17 as shown in Fig. 10. It is to be noted that every embodiment of the invention as shown in Fig. 1 is utilized in the form of invention as shown in Fig. 10, with the exception of converting an assembly unit gear to a solid gear.

The reverse movement of the shaft 2 is accomplished by shifting the sliding clutch 68 through fork 70 to direct engagement with the toothed base 69 and the gear 65 as already described. The resulting movement of the gears 65, the reverse idling gear, not shown, and the gear 64 will actuate the shaft 3 which in turn will actuate the gear 39 which is meshed with gear 41 which will actuate the shaft 2 into reverse at a rate bearing a constant ratio to the rate of rotation of the driving shaft 1, with the gear cluster 4, 5, and 6 as well as the gear 67 idling relative to the driving shaft.

The operation, when mounted on an automobile, may be described as follows:—The motor having been started, the fork 70 is manipulated to cause the clutch 68 to operatively engage the gear 67 which is geared to gear 6 thereby causing the gear cluster 4, 5, and 6, to rotate. The gears 11 and 93 which are constantly in mesh with gears 4 and 5, respectively, will each also be rotated by the driving shaft 1. The diameters of the gears 11 and 4 are such as to adapt these gears for low speed transmission. Likewise the diameters of the gears 93 and 5 are such as to adapt them for second speed transmission, while the direct engagement with shafts 1 and 2 will adapt them for high speed transmission.

The initial movement of the driving shaft 1, with the clutch 68, operatively engaging the gear 67 which is meshed with gear 6, of the cluster 4, 5, and 6, will cause the gear 11 to move from neutral to operative engagement with the shaft 73 thereby driving the shaft at low speed. The ratio of the rate of rotation of driven shaft 2, to that of driving shaft 1 remains constant while the shaft is being driven in low speed. As the speed of the driving shaft 1 increases by the control of the power in the usual manner, the speed of the shaft 2 will be correspondingly increased until the latter rotates at a rate sufficient that the centrifugal force will move the weights 22 of the governor 49 outwardly and shift the control collar 51 from the position shown in Fig. 3 to that shown in Fig. 4, providing, however, that the torque resistance between shafts 73 and 2 operating plunger 81 on the governor 49 has not exceeded that selected as the predetermined torque resistance for second speed engagement. Should the torque exceed that selected as the proper resistance, this excess torque will twist shaft 73 over shaft 2 sufficiently to prevent the speed responsive means from shifting the collar 51 into engagement position, and as long as the torque is in excess of the predetermined torque resistance the torque resistance means will not permit the speed responsive means to move collar 51 even though the speed of the driven shaft greatly exceeds the rate at which the speed responsive means should move the collar 51. However the instant the torque between shafts 73 and 2 is reduced so as to permit shaft 73 to twist back over shaft 2 to its original position, thus permitting free action of the speed responsive means, the said speed responsive means will instantly move collar 51 which in turn will move rollers 29 into engagement position.

This movement of the collar 51 will cause the shaft 2 to be driven by the second speed combination 93, or 14 and 5, and will permit the rotating of gear 11 to idle on the shaft and the high speed unit (94, 27, and 99) or 17 will also continue in neutral position relative to the driven shaft. The rate of the driven shaft 2 will thereby be automatically raised from low speed to second speed, and as the rate of the driving shaft 1 is further increased, the driven shaft will rotate at a speed whereby the centrifugal force will cause the governor 21 to move the control collar 52 and the high speed driving unit (94, 27, and 99) or 17 from idling position shown in Fig. 3 to the position shown in Fig. 4, also providing, however, that the torque resistance between shafts 73 and 2 operating plunger 81 on the governor 49 has not exceeded that selected as the predetermined torque resistance for high speed engagement should the torque exceed that selected as the proper resistance, this excess torque will twist shaft 73 over shaft 2 sufficiently to prevent the speed responsive means from moving the collar 52 into engagement position, and as long as the torque is in excess of the predetermined torque resistance the torque resisting means will not permit the speed responsive means to move collar 52 even though the speed of the driven shaft greatly exceeds the rate at which the speed responsive means should move the collar 52. However, the instant the torque between shafts 73 and 2 is reduced so as to permit shaft 73 to twist back over shaft 2 to its original position, as will be brought about by springs 88, 89, and 90, thus permitting free action of the speed responsive means, the said speed responsive means will instantly move collar 52, which in turn will move rollers 30 into engagement position. The high speed driving unit (94, 27, and 99) or 17 will be operatively connected with driven shaft 2 and the speed of the driven shaft will be automatically changed from second to high. The gears 11 and 93, or 14, will meantime continue to rotate but will idle about the shaft 2.

The governor 49 is in extended position when operating at high speed. Upon slowing up of the shaft 2 to a rate just below that at which the weights 22 on the governor 49 are moved outwardly, the governor will collapse sufficiently to move the collar 52 to neutral position. Should the torque resistance be increased just over the resistance set as the proper resistance for high speed, regardless of the excess rate of rotation of the driven shaft, the plunger 81 will cause the same movement of the governor 49 and collar 52 which will bring the collar 52 to neutral position.

The collar 51 being in the position shown in Fig. 4 will then cause the gear 14 or 93 to actuate the shaft 2 and the high speed unit (94, 27, and 99) or 17 will idle relative to the shaft 2. A further reduction of the speed of the driven shaft to a point just below the rate at which the weights 22 of the governor 49 were moved outwardly sufficiently to move collar 51 into engagement position, will permit the governor to further collapse sufficiently to move the collar 51 to neutral position. Again, should the torque resistance be increased just over the resistance set as the proper resistance for second speed, regardless of the excess rate of rotation of the driven shaft, the plunger 81 will cause the same movement of the governor weights 22 and collar 51 which will bring the collar 51 to neutral position.

The collars 52 and 51 each in turn being brought to neutral positions, will then cause the gear 11 to actuate the shaft 2 and the second speed gear 14 or 93 as well as the high speed unit (94, 27, and 99) or 17 will idle relative to the shaft 2.

The governor 49 is so arranged that the weights 22 will move outwardly under centrifugal force when the rate of the shaft 2 reaches a predetermined upper limit selected as the point of change from low to second speed. During rotation of the shaft at second speed, the pin 55 will remain at the points of intersection between the inclined and the radial portions of the grooves 25 and 87. It will be observed that the outward movement of the weights 22 corresponding to second will cause the pin 55 to rotate the collar 51 to a position operatively engaging the gear 93 or 14 with shaft 2. Inasmuch as this outward movement of the pin 55 is radial, no rotation of the collar 52 will result and the high speed unit (94, 27, and 99) or 17 will remain neutral. Upon increasing the speed of the driven shaft to a rate selected as the division point between second and high speeds the weights 22 will be moved from the intermediate position wherein the pin 55 is at the intersection of the respective slot portions and the pin 55 will be moved to the extreme outer end of the slots. The further movement of the pin 55 will not further move the collar 51 by reason of the outer portion of the slot 25 being parallel to the path of the pin but such movement will rotate the collar 52 an amount to bring the high speed unit (94, 27, and 99) or 17 into operative engagement with the shaft 2. As a result of this further movement of the weights 22 of the governor 49 both of the collars 51 and 52 will occupy a position corresponding to that shown in Fig. 4 for the collars 51 and 52. As a result the high speed unit (94, 27, and 99) or 17, will drive the shaft 2 and the gear 93 or 14 will idle relative to the shaft. Upon slowing up of the driven shaft reverse movement of the governor 49 and the collars 51 and 52 will occur and as a result there will be effected a change in speed of the driven shaft from high to second and still further slowing up of the speed of the driven shaft will result in a change of speed from second to low.

Should the occasion arrive when the driver desires positive manual control of the conventional type, that is, without either the automatic feature or the free-wheeling feature the device can be operated as follows. By shifting the clutch 10 thru means of a convenient lever (not shown) so to engage toothed base 76 with toothed part of gear 14 or 93 a positive connection will exist between the driving shaft 1 and driven shaft 2 at second speed. It should be noted that when the clutch 10 was shifted into engagement position with gear 93 or 14 that the clutch also shifted the lug 78, by means of the connector pin 50, into position which prevents the speed responsive means from permitting the rollers 30 to be in engagement position. The lug 78 when moved by clutch 10 either forces the plunger 80 radially outward or prevents the plunger 80 from moving radially inward.

The positive manual conventional for high speed is accomplished by shifting clutch 99, thru means of the above mentioned convenient lever, into direct engagement with the toothed part of the hollow base 19. This engagement will directly connect shafts 1 and 2 around the entire automatic mechanism. When either second or high speed is manually operatively connected, the automatic features as well as the free-wheeling features are rendered ineffective.

Thus it will be seen that I have provided a novel transmission mechanism automatically operable by changes in speed of driving and driven shafts and by changes in the torque resistance between the shafts to substantially change the ratio of the speed of the driven shaft to that of the driving shaft.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In a power transmission, a driven and a driving shaft, three sets of variable speed transmission gears simultaneously actuated by the driving shaft, driven gears of each set rotatably mounted and operatively connected with the driven shaft in one direction through individual one-way overriding mechanisms, said one-way mechanisms other than low speed having individually controlled means adapted to permit connection or disconnection of the driven gears with the driven shaft, speed responsive means adapted to operatively actuate said control one-way mechanisms to successively operatively connect the driven gears of each set with the driven shaft from low to second to high and to maintain said connected set, or sets, in connected position, until said speed responsive means successively disconnect the driven gears from the driven shaft from high to second to low, and means whereby the said speed responsive means is further actuated and controlled by pre-determined torque resistances of the driven shaft.

2. In a power transmission, a driven and a driving shaft, a plurality of sets of variable speed transmission gears simultaneously actuated by the driving shaft, driven gears of each set rotatably mounted and operatively connective to the driven shaft in one direction through individual one-way overriding mechanisms, said one-way mechanism other than low speed having individually controlled means adapted to permit connection or disconnection of the driven gears with the driven shaft, speed responsive means adapted to operatively actuate said control one-way mechanisms to successively operatively connect the driven gears of each set with the driven shaft from low to second to high and to maintain it and said connected set in connected position until said speed responsive means successively disconnect the driven gears from the driven shaft from high to second to low, and means whereby the said speed responsive means is further actuated and controlled by pre-determined torque resistances of the driven shaft.

3. In a device of the kind described, a driving shaft, a driven shaft, a plurality of sets of meshed transmission gears simultaneously actuated by the driving shaft, each set operable to actuate the driven shaft at a different rate of speed relative to the driving shaft, the low speed driven gear of the low speed set constantly operatively connected with the driven shaft through an individual one-way overriding mechanism to actuate said shaft in one direction, one gear of each of the other sets being mounted on and freely revolvable about the driven shaft, individual one-way overriding mechanisms for each of said revolvable gears, said last mentioned mechanisms having individual means adapted to permit connection or disconnection of the revolvable gears with the driven shaft, and means automatically actuated in response to predetermined rates of speed of the driven shaft to move said last mentioned mechanisms to successively operatively connect said revolvable gears with the driven shaft as the speed of the driven shaft is increased, and means automatically actuated in response to pre-determined torque resistances of the driven shaft to further control said speed responsive means.

4. In a device of the kind described, a driving shaft, a driven shaft, three sets of meshed transmission gears simultaneously actuated by the driving shaft, each set operable to actuate the driven shaft at a different rate of speed relative to the driving shaft, one gear of the low speed set constantly connected to the driven shaft in one direction through an individual one-way overriding mechanism, one gear of each of the other sets being mounted on and freely revolvable about the driven shaft, individual one-way overriding mechanisms operatively connected with the intermediate and high speed revolvable gears, each having individual means adapted to connect and disconnect corresponding revolvable gears with the driven shaft, means automatically actuated in response to predetermined rates of speed of the driven shaft to successively move said last mentioned one-way mechanisms to operatively connect the corresponding revolvable gears with the driven shaft as the speed of said shaft is increased from low to second to high and to successively disconnect said revolvable gears from the driven shaft as the speed of said shaft is diminished from high to second to low, and means automatically actuated in response to predetermined torque resistances of the driven shaft to further control said speed responsive means.

5. In a device of the kind described, a driving shaft, a driven shaft, a plurality of sets of gears simultaneously actuated by the driving shaft, one gear of each set being mounted on and revolvable about the driven shaft, each of said revolvable gears being actuated by the driving shaft at a different rate, one-way overriding mechanisms adapted to operatively connect the slowest of said revolvable gears with said driven shaft, individual one-way overriding mechanism adapted to operatively connect and disconnect each of the other of said revolvable gears with said driven shaft, and speed responsive means automatically operable to successively operatively connect the others of said revolvable gears with the driven shaft when the speed of said shaft reaches corresponding predetermined rates, and means whereby the said speed responsive means is further actuated and controlled by predetermined torque resistances of the driven shaft, and means manually operated to operatively engage either of said sets of gears with the driven shaft in both directions independent of either of the above mentioned automatic means.

6. In a power transmission, a driven and a driving shaft, three sets of variable speed transmission gears simultaneously actuated by the driving shaft, driven gears of each set rotatably mounted and operatively connected with the driven shaft in one direction through individual one-way over-riding mechanisms, said one-way mechanisms other than low speed having individually controlled means adapted to permit connection or disconnection of the driven gears with the driven shaft, speed responsive means and torque resistance means adapted to operatively actuate said control one-way mechanisms, said speed responsive means adapted to operatively actuate said control one-way over-riding mechanisms to successively operatively connect the driven gears of each set with the driven shaft from low to second to high, connective means between said speed responsive means and said torque resistance means to prevent said speed responsive means from connecting the driven shaft to a higher speed gear until the predetermined torque resistance of the driven shaft has been reached for said higher speed, and to maintain the said connected set or sets in connected position, until either the said speed responsive means or the said torque resistance means successively disconnect the driven gears from the driven shaft from high to second to low.

7. In a free-wheeling power transmission, comprising a driving shaft, a driven shaft, torque resistance means, a plurality of meshed sets of over-running one-way change speed gears severally and simultaneously actuated by the driving shaft, speed responsive means automatically operable to successively connect and disconnect the several sets of gears with the driven shaft, and means actuated in response to said torque resistance means to additionally operate and control said speed responsive means.

8. In a power transmission of the kind described, a driving shaft, a driven shaft, a plurality of constantly meshed sets of variable speed gears, driven gears of each set rotatably mounted and connected in one direction only to the driven shaft through one-way over-riding mechanisms, means operable in response to predetermined speeds of the driven shaft to actuate said one-way mechanisms to successively connect or disconnect said driven gears with the driven shaft and means operable in response to predetermined torque resistances of the driven shaft to further actuate and control said speed responsive means and means manually operated to operably connect, or disconnect, said driven gears with the driven shaft independent and without interference from either of said automatic means.

GEORGES ROUDANEZ.